(12) United States Patent
Boesen et al.

(10) Patent No.: US 11,599,333 B2
(45) Date of Patent: *Mar. 7, 2023

(54) INPUT AND EDIT FUNCTIONS UTILIZING ACCELEROMETER BASED EARPIECE MOVEMENT SYSTEM AND METHOD

(71) Applicant: BRAGI GmbH, Munich (DE)

(72) Inventors: Peter Vincent Boesen, Munich (DE); Luigi Belverato, Munich (DE); Martin Steiner, Munich (DE)

(73) Assignee: BRAGI GMBH, Munich (DE)

( * ) Notice: Subject to any disclaimer, the term of this patent is extended or adjusted under 35 U.S.C. 154(b) by 84 days.

This patent is subject to a terminal disclaimer.

(21) Appl. No.: 17/191,366

(22) Filed: Mar. 3, 2021

(65) Prior Publication Data
US 2021/0208844 A1 Jul. 8, 2021

Related U.S. Application Data

(63) Continuation of application No. 15/790,653, filed on Oct. 23, 2017, now Pat. No. 10,942,701.
(Continued)

(51) Int. Cl.
*G06F 3/16* (2006.01)
*G06F 3/01* (2006.01)
(Continued)

(52) U.S. Cl.
CPC ............ *G06F 3/167* (2013.01); *G06F 3/011* (2013.01); *G06F 3/012* (2013.01); *G06F 3/165* (2013.01);
(Continued)

(58) Field of Classification Search
CPC ......... G10L 15/22; G10L 15/26; G10L 15/30; H04R 2225/025; H04R 2225/55; G06F 3/167; G06F 3/017; G06F 3/04842
(Continued)

(56) References Cited

U.S. PATENT DOCUMENTS 2,325,590 A 8/1943 Carlisle et al.
2,430,229 A 11/1947 Kelsey
(Continued)

FOREIGN PATENT DOCUMENTS

CN 204244472 U 4/2015
CN 104683519 A 6/2015
(Continued)

OTHER PUBLICATIONS

Akkermans, "Acoustic Ear Recognition for Person Identification", Automatic Identification Advanced Technologies, 2005 pp. 219-223.
(Continued)

*Primary Examiner* — Alexander Krzystan
(74) *Attorney, Agent, or Firm* — Goodhue, Coleman & Owens, P.C.

(57) ABSTRACT

A method for performing voice dictation with an earpiece worn by a user includes receiving as input to the earpiece voice sound information from the user at one or more microphones of the earpiece, receiving as input to the earpiece user control information from one or more sensors within the earpiece independent from the one or more microphones of the earpiece, inserting a machine-generated transcription of the voice sound information from the user into a user input area associated with an application executing on a computing device and manipulating the application executing on the computing device based on the user control information.

10 Claims, 5 Drawing Sheets

Related U.S. Application Data

(60) Provisional application No. 62/415,278, filed on Oct. 31, 2016.

(51) Int. Cl.
*H04R 1/10* (2006.01)
*G10L 15/22* (2006.01)
*G10L 15/26* (2006.01)
*G06F 40/174* (2020.01)

(52) U.S. Cl.
CPC ............ *G06F 40/174* (2020.01); *G10L 15/22* (2013.01); *G10L 15/26* (2013.01); *H04R 1/1016* (2013.01); *H04R 1/1041* (2013.01); *H04R 1/1083* (2013.01); *H04R 2201/107* (2013.01); *H04R 2460/07* (2013.01); *H04R 2460/13* (2013.01)

(58) Field of Classification Search
USPC ................ 381/315; 455/414.4; 704/275, 235
See application file for complete search history.

(56) References Cited

U.S. PATENT DOCUMENTS

| | | |
|---|---|---|
| 3,047,089 A | 7/1962 | Zwislocki |
| D208,784 S | 10/1967 | Sanzone |
| 3,586,794 A | 6/1971 | Michaelis |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin et al. |
| 8,436,780 B2 | 5/2013 | Schantz et al. |
| D687,021 S | 7/2013 | Yuen |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |

(56) References Cited

U.S. PATENT DOCUMENTS

| | | |
|---|---|---|
| 9,952,672 B2 | 4/2018 | Björklund et al. |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0111265 A1 | 6/2004 | Forbes |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1 | 6/2008 | LeBoeuf et al. |
| 2008/0187163 A1 | 8/2008 | Goldstein et al. |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0320961 A1 | 12/2010 | Castillo et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2012/0057740 A1 | 3/2012 | Rosal |
| 2012/0310115 A1 | 12/2012 | Bedingham et al. |
| 2013/0278631 A1* | 10/2013 | Border .................. G06Q 30/02 345/633 |
| 2013/0316642 A1 | 11/2013 | Newham |
| 2013/0346168 A1 | 12/2013 | Zhou et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0195252 A1 | 7/2014 | Gruber et al. |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0110587 A1 | 4/2015 | Hori |
| 2015/0143297 A1 | 5/2015 | Wheeler et al. |
| 2015/0148989 A1 | 5/2015 | Cooper et al. |
| 2015/0193098 A1* | 7/2015 | Kauffmann ........... G06F 3/0488 345/173 |
| 2015/0245127 A1 | 8/2015 | Shaffer |
| 2015/0373467 A1 | 12/2015 | Gelter |
| 2015/0373474 A1 | 12/2015 | Kraft et al. |
| 2016/0033280 A1 | 2/2016 | Moore et al. |
| 2016/0072558 A1 | 3/2016 | Hirsch et al. |
| 2016/0073189 A1 | 3/2016 | Lindén et al. |
| 2016/0103655 A1 | 4/2016 | Klein |
| 2016/0125892 A1 | 5/2016 | Bowen et al. |
| 2016/0188143 A1 | 6/2016 | Kohlmeier et al. |
| 2016/0353196 A1 | 12/2016 | Baker et al. |
| 2016/0360350 A1 | 12/2016 | Watson et al. |
| 2017/0011178 A1 | 1/2017 | Hendrickson et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0142511 A1 | 5/2017 | Dennis |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215011 A1* | 7/2017 | Goldstein ............ H04R 25/305 |
| 2017/0215016 A1 | 7/2017 | Dohmen et al. |
| 2017/0230752 A1 | 8/2017 | Dohmen et al. |

(56) References Cited

U.S. PATENT DOCUMENTS

| | | | |
|---|---|---|---|
| 2017/0251933 | A1 | 9/2017 | Braun et al. |
| 2017/0257698 | A1 | 9/2017 | Boesen et al. |
| 2017/0263236 | A1 | 9/2017 | Boesen et al. |
| 2017/0273622 | A1 | 9/2017 | Boesen |
| 2018/0121623 | A1* | 5/2018 | Boesen ................ A61B 5/6817 |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 11/1981 |
| GB | 2508226 A | 5/2014 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Announcing the $3,333,333 Stretch Goal (Feb. 24, 2014) pp. 1-14.
Ben Coxworth: "Graphene-based ink could enable low-cost, foldable electronics", "Journal of Physical Chemistry Letters", Northwestern University, (May 22, 2013), pp. 1-7.
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI Is On Facebook (2014), pp. 1-51.
BRAGI Update—Arrival Of Prototype Chassis Parts—More People—Awesomeness (May 13, 2014), pp. 1-8.
BRAGI Update—Chinese New Year, Design Verification, Charging Case, More People, Timeline(Mar. 6, 2015), pp. 1-18.
BRAGI Update—First Sleeves From Prototype Tool—Software Development Kit (Jun. 5, 2014), pp. 1-8.
BRAGI Update—Let's Get Ready To Rumble, A Lot To Be Done Over Christmas (Dec. 22, 2014), pp. 1-18.
BRAGI Update—Memories From April—Update On Progress (Sep. 16, 2014), pp. 1-15.
BRAGI Update—Memories from May—Update On Progress—Sweet (Oct. 13, 2014), pp. 1-16.
BRAGI Update—Memories From One Month Before Kickstarter—Update On Progress (Jul. 10, 2014), pp. 1-17.
BRAGI Update—Memories From The First Month of Kickstarter—Update on Progress (Aug. 1, 2014), pp. 1-16.
BRAGI Update—Memories From The Second Month of Kickstarter—Update On Progress (Aug. 22, 2014), pp. 1-15.
BRAGI Update—New People @BRAGI—Prototypes (Jun. 26, 2014), pp. 1-9.
BRAGI Update—Office Tour, Tour To China, Tour to CES (Dec. 11, 2014), pp. 1-14.
BRAGI Update—Status On Wireless, Bits and Pieces, Testing—Oh Yeah, Timeline(Apr. 24, 2015), pp. 1-18.
BRAGI Update—The App Preview, The Charger, The SDK, BRAGI Funding and Chinese New Year (Feb. 11, 2015), pp. 1-19.
BRAGI Update—What We Did Over Christmas, Las Vegas & CES (Jan. 19, 2014), pp. 1-21.
BRAGI Update—Years of Development, Moments of Utter Joy and Finishing What We Started(Jun. 5, 2015), pp. 1-21.
BRAGI Update—Alpha 5 and Back To China, Backer Day, On Track(May 16, 2015), pp. 1-15.
BRAGI Update—Beta2 Production and Factory Line(Aug. 20, 2015), pp. 1-16.
BRAGI Update—Certifications, Production, Ramping Up (Nov. 13, 2015), pp. 1-15.
BRAGI Update—Developer Units Shipping and Status(Oct. 5, 2015), pp. 1-20.
BRAGI Update—Developer Units Started Shipping and Status (Oct. 19, 2015), pp. 1-20.
BRAGI Update—Developer Units, Investment, Story and Status(Nov. 2, 2015), pp. 1-14.
BRAGI Update—Getting Close(Aug. 6, 2015), pp. 1-20.
BRAGI Update—On Track, Design Verification, How It Works and What's Next(Jul. 15, 2015), pp. 1-17.
BRAGI Update—On Track, On Track and Gems Overview (Jun. 24, 2015), pp. 1-19.
BRAGI Update—Status On Wireless, Supply, Timeline and Open House@BRAGI(Apr. 1, 2015), pp. 1-17.
BRAGI Update—Unpacking Video, Reviews On Audio Perform and Boy Are We Getting Close(Sep. 10, 2015), pp. 1-15.
Healthcare Risk Management Review, "Nuance updates computer-assisted physician documentation solution" (Oct. 20, 2016), pp. 1-2.
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017), pp. 1-8.
Hyundai Motor America, "Hyundai Motor Company Introduces A Health + Mobility Concept For Wellness In Mobility", Fountain Valley, Californa (2017), pp. 1-3.
International Search Report & Written Opinion, PCT/EP2016/070231 (dated Nov. 18, 2016) 12 pages.
Last Push Before The Kickstarter Campaign Ends on Monday 4pm CET (Mar. 28, 2014), pp. 1-7.
Nigel Whitfield: "Fake tape detectors, from the stands' footie and UGH? Internet of Things in my set-top box" http://www.theregister.co.uk/2014/09/24/ibc_round_up_object_audio_dina_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.htm!", 4 pages (Jul. 28, 2015).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014), pp. 1-14.
Stretchgoal—The Carrying Case for The Dash (Feb. 12, 2014), pp. 1-9.
Stretchgoal—Windows Phone Support (Feb. 17, 2014), pp. 1-17.
The Dash + The Charging Case & The BRAGI News (Feb. 21, 2014), pp. 1-12.
The Dash—A Word From Our Software, Mechanical and Acoustics Team + An Update (Mar. 11, 2014), pp. 1-7.
Update From BRAGI—$3,000,000—Yipee (Mar. 22, 2014), pp. 1-11.
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).

* cited by examiner

INPUT AND EDIT FUNCTIONS UTILIZING ACCELEROMETER BASED EARPIECE MOVEMENT SYSTEM AND METHOD

PRIORITY STATEMENT

This application is a continuation of application Ser. No. 15/790,653, filed Oct. 23, 2017 which claims priority to U.S. Provisional Patent Application 62/415,278, filed on Oct. 31, 2016, and entitled Input and Edit Functions Utilizing Accelerometer Based Earpiece Movement System and Method, both of which are hereby incorporated by reference in their entireties.

FIELD OF THE INVENTION

The present invention relates to wearable devices. More particularly, but not exclusively, the present invention relates to wearable devices such as ear pieces which include one or more accelerometers.

BACKGROUND

The use of wireless earpieces to perform dictation input presents great promise to those who must complete massive forms and paperwork. Such professions as medicine, law, accounting, insurance, and finance among others must create customized documents that oftentimes rely heavily on user input. Such user input currently comes at great cost; either the user must dictate into a microphone, or rely on microphones operatively connected to a computer or host device. Such microphones must extrapolate speech from ambient environmental noise. This is no easy task. Consequently, the work product is oftentimes plagued with artifact induced errors, increasing the workload of the user and contributing to worker fatigue. Over time, such difficulties also may lead to issues involving the physical health of the user, such as vocal fatigue, induced vocal strain, changes to the voice as witnessed through analysis of shimmer and jitter rates and ultimately, development of vocal fold pathology such as true vocal fold nodules or plica ventricularis to name but a few. As such, what is needed are new systems and methods that address the weaknesses in the prior art.

SUMMARY

Therefore, it is a primary object, feature, or advantage of the present invention to improve over the state of the art.

It is a further object, feature, or advantage of the present invention to provide a system that provides multimodality control over data input.

It is a still further object, feature, or advantage of the present invention to provide a system that allows the user to control input and editing functions via usage of the onboard accelerometers.

Another object, feature, or advantage is to allow the user to use the earpiece accelerometers within the device to facilitate the movement of the cursor through a document.

Yet another object, feature, or advantage is to allow the user to use the earpiece accelerometers to perform advanced edit functions within the device.

A further object, feature, or advantage is to program gesture commands through an accompanying app on a cell phone or computer.

A still further object, feature, or advantage is to override command functions as desired by a user and allow accessory functions to be enabled or disabled as desired by a user operator.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect, a method for performing voice dictation with an earpiece worn by a user is provided. The method includes receiving as input to the earpiece voice sound information from the user at one or more microphones of the earpiece. The method further includes receiving as input to the earpiece user control information from one or more sensors within the earpiece independent from the one or more microphones of the earpiece. The method further includes inserting a machine-generated transcription of the voice sound information from the user into a user input area associated with an application executing on a computing device and manipulating the application executing on the computing device based on the user control information. The user control information may include a head gesture from the user, the head gesture detected using one or more inertial sensors of the earpiece. The user control information may include a gesture made at or proximate the earpiece to alter a field and detected using one or more sensors of the ear piece. The gesture may be one of any number of gestures such as a tap, a double tap, a triple tap, a hold, and a swipe. The input area may be within a document. The user control information may be used to move between fields within the user input area. The user control information may be used to indicate whether the machine generated transcription is accurate or not. The gesture may be used to change position within the document. The method may further include receiving a voice command at the ear piece from the user at the one or more microphones of the earpiece and further manipulating the application executing on the computing device using the voice command.

According to another aspect, an earpiece includes an earpiece housing, an inertial sensor disposed within the ear piece housing, a processor disposed within the ear piece housing and operatively connected to the ear piece housing, and at least one microphone operatively connected to the processor. The earpiece is configured to sense head movements made by a user of the earpiece using the inertial sensor. The may be further configured to receive voice dictation from the user of the earpiece using the at least one microphone and to interpret the head movements into instructions and convey the instructions to a computing device in operative communication with the earpiece. The earpiece may further include a gesture control interface configured to detect gestures from a user made at or proximate the earpiece. The gestures may include a single tap, a double tap, a triple tap, a hold, and a swipe. The earpiece may be configured to convey the gestures to the computing device in operative communication with the earpiece.

According to another aspect, a system includes an earpiece having an earpiece housing, an inertial sensor disposed within the ear piece housing, a processor disposed within the ear piece housing and operatively connected to the ear piece housing, and at least one microphone operatively connected to the processor. The earpiece is configured to sense head movements made by a user of the earpiece using the inertial sensor. The earpiece is configured to receive voice dictation from the user of the earpiece using the at least one microphone and the earpiece is configured to interpret the head movements into instructions and convey the instructions to a computing device in operative communication with the earpiece. The system further includes a software application executing on a computing device wherein the software application is configured to control receiving of voice sound information or text from voice sound information from the earpiece and the instructions from the head movements into a user input area. The earpiece may further include a gesture control interface operatively connected to the processor, wherein the gesture control interface detects one or more gestures made by the user. The software application may be a mobile application and the computing device may be a mobile device.

DETAILED DESCRIPTION

An earpiece device allows hands free communication through a wireless network. Said wireless network may use an optimized microphone linked to a voice engine for transcription of the voice data. The system may be configured to insert transcribed voice data into text boxes in the main program, or as directed by a user into a document. Gesture commands may be used to control the system using one or more accelerometers present in the earpiece. In doing so, greatest flexibility may be achieved to rapidly input data into the document. This allows the user maximal advantage in the data input, increasing the overall efficiency of data input. This may be a particularly important advantage to any number of professionals including doctors, lawyers, engineers, accounts, and others.

Figure 1:
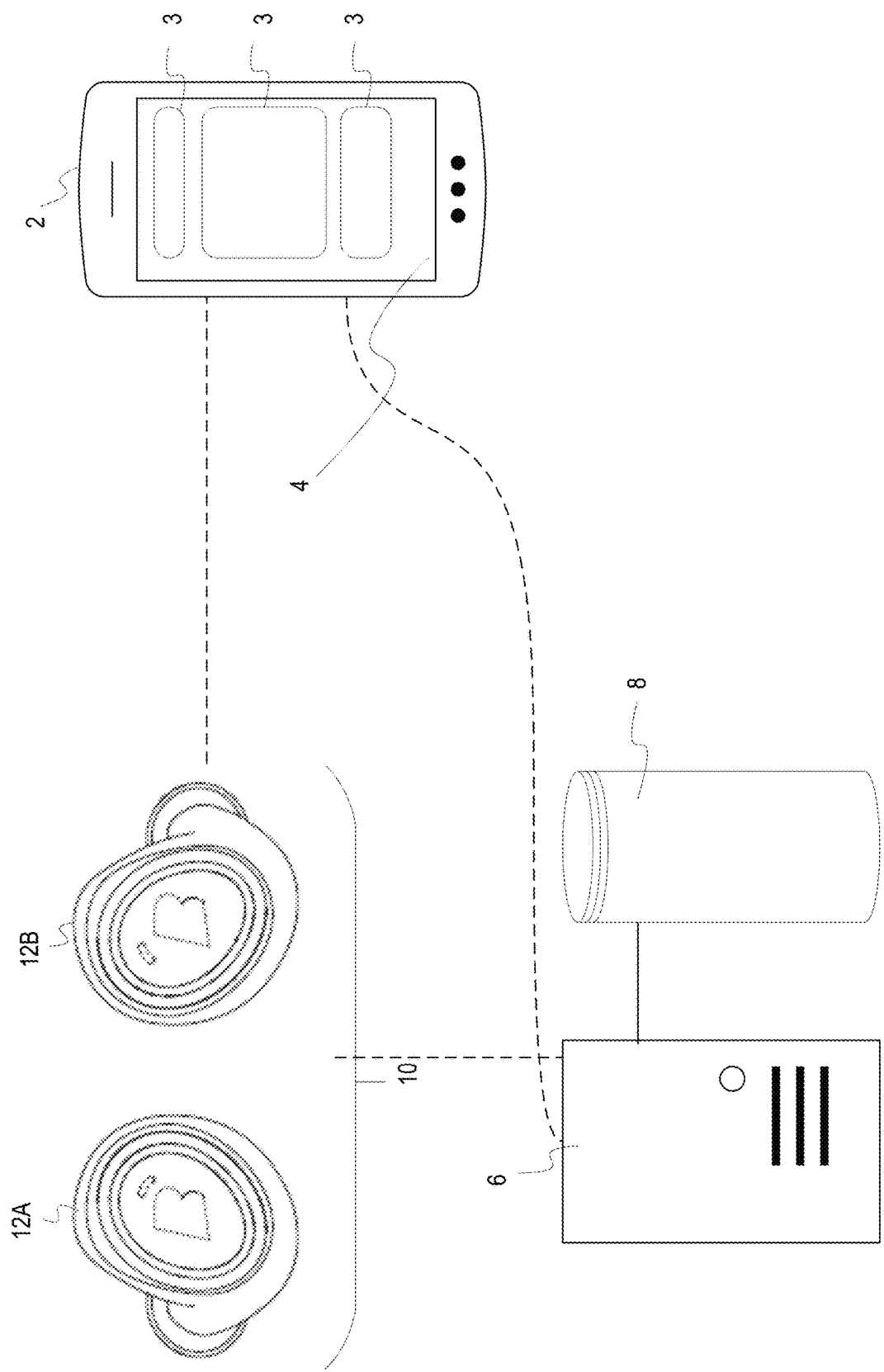
FIG. 1 is a diagram of one example of a system.

FIG. 1 illustrates one example of a system which includes a set of earpieces 10 which includes a left earpiece 12A and a right earpiece 12B. One or both wireless earpieces 12A, 12B may be in communication with a computing device such as a mobile device 2 with display 4. A software application executing on the computing device 2 may include an interface with a plurality of input areas 3 for collecting input from a user via voice dictation. In operation, a person using one or both of the earpieces 12A, 12B may dictate voice information which is received into the one of the input areas 3. The determination as to which input area 3 voice information is received into may be performed in various ways. For example, if a blinking cursor is shown in one of the input areas, but not the input area desired by the user, the user may shake their head no to indicate that this is not the correct input area. If it is the correct area, input area, then the user may nod their head with a yes motion. Thus, head movement of the user may be used to select the appropriate input area 3. One or more wireless earpieces 12A, 12B may be in operative communication with a computing device such as a server 6 which may be operatively connected to a database 8 either directly or through a mobile device 4. The server 6 may be a server platform which provides for voice to text conversion. For example, voice sound information may be received which was initially collected at the earpieces. This voice sound information may be converted into text information at the server 6 and then returned to the earpiece, to the computing device 2 or other device.

Figure 2:
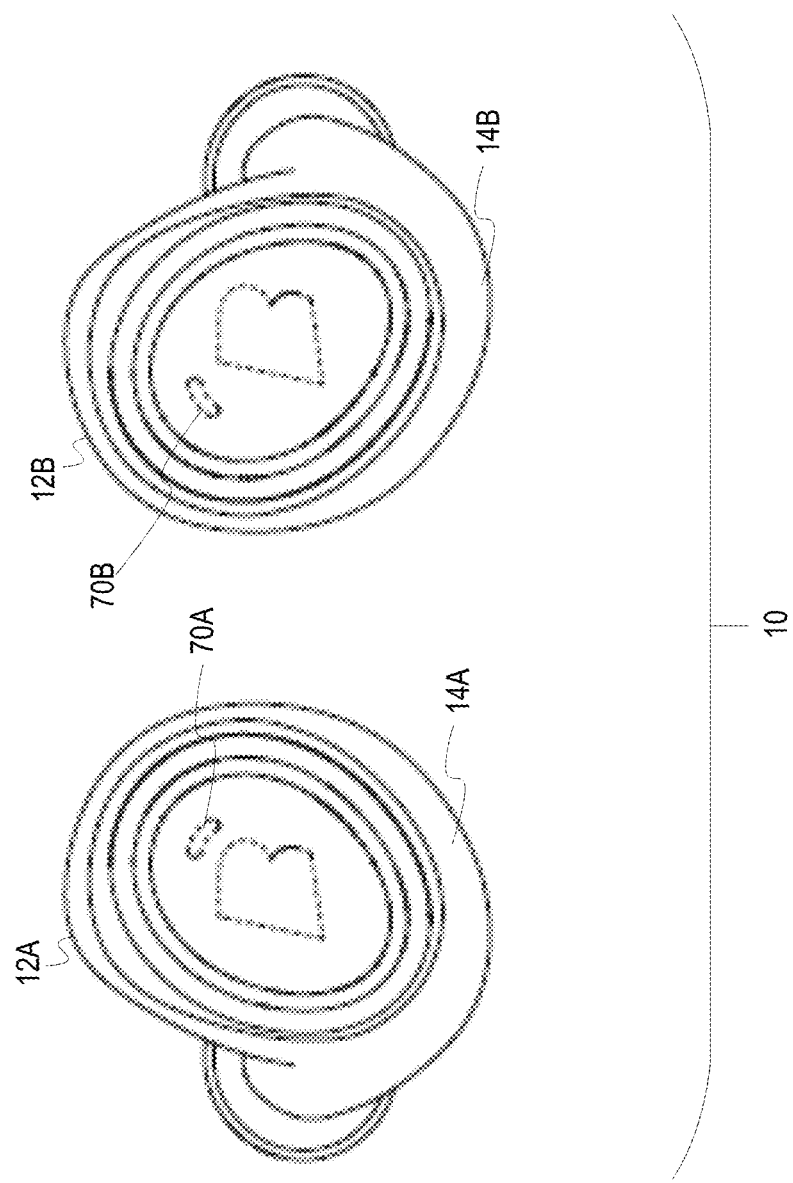
FIG. 2 illustrates a set of earpieces.

FIG. 2 illustrates a set 10 of earpieces 12A, 12B in greater detail. Each earpiece 12A, 12B has a housing 14A, 14B and may include an external facing microphone 70A, 70B.

Figure 3:
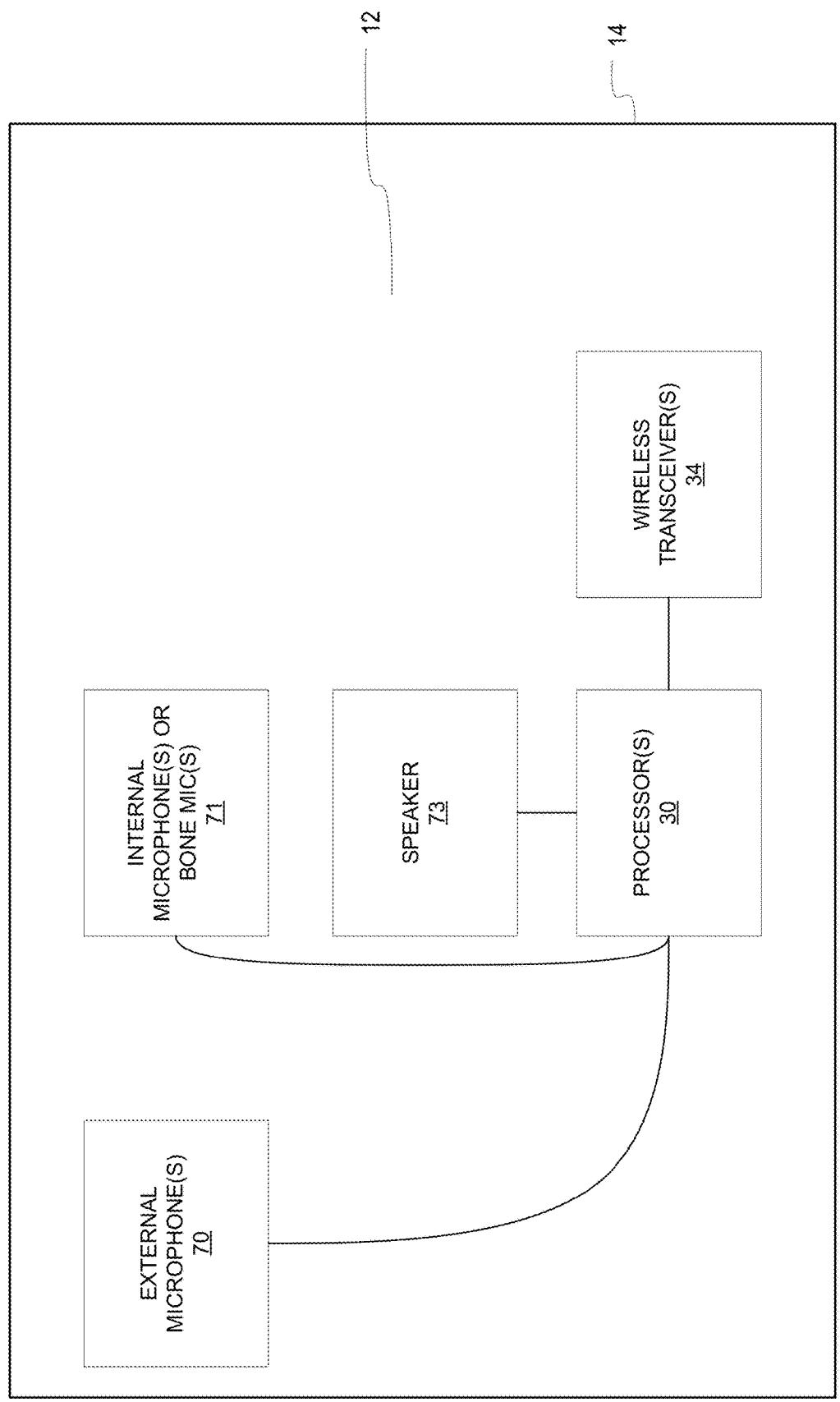
FIG. 3 is a block diagram of one example of an earpiece.

FIG. 3 illustrates a block diagram of one example of an earpiece 12 having a housing 14. One or more external microphones 70 are shown as well as one or more internal microphones or bone microphones 71. The internal microphones which may include one or more bone condition microphones and/or air conduction microphones may be used to detect voice sound information from a user wearing the earpiece. The external microphones 70 may be used for various purposes including to detect external or ambient sound which may be used during audio processing to assist in removing background noise or other sounds which are not voice sound information. The various microphones 70, 71 may be in operative communication with a processor 30 which may include a sound processor, microprocessor, audio processor or other processing components. A speaker 73 is operatively connected to the processor 30 as well. One or more wireless transceivers 34 may also be operatively connected to the processors 30. This may include a Bluetooth or BLE transceiver, a near field magnetic induction (NFMI), or other type of radio transceiver, induction transceiver, or other type of transceiver.

Figure 4:
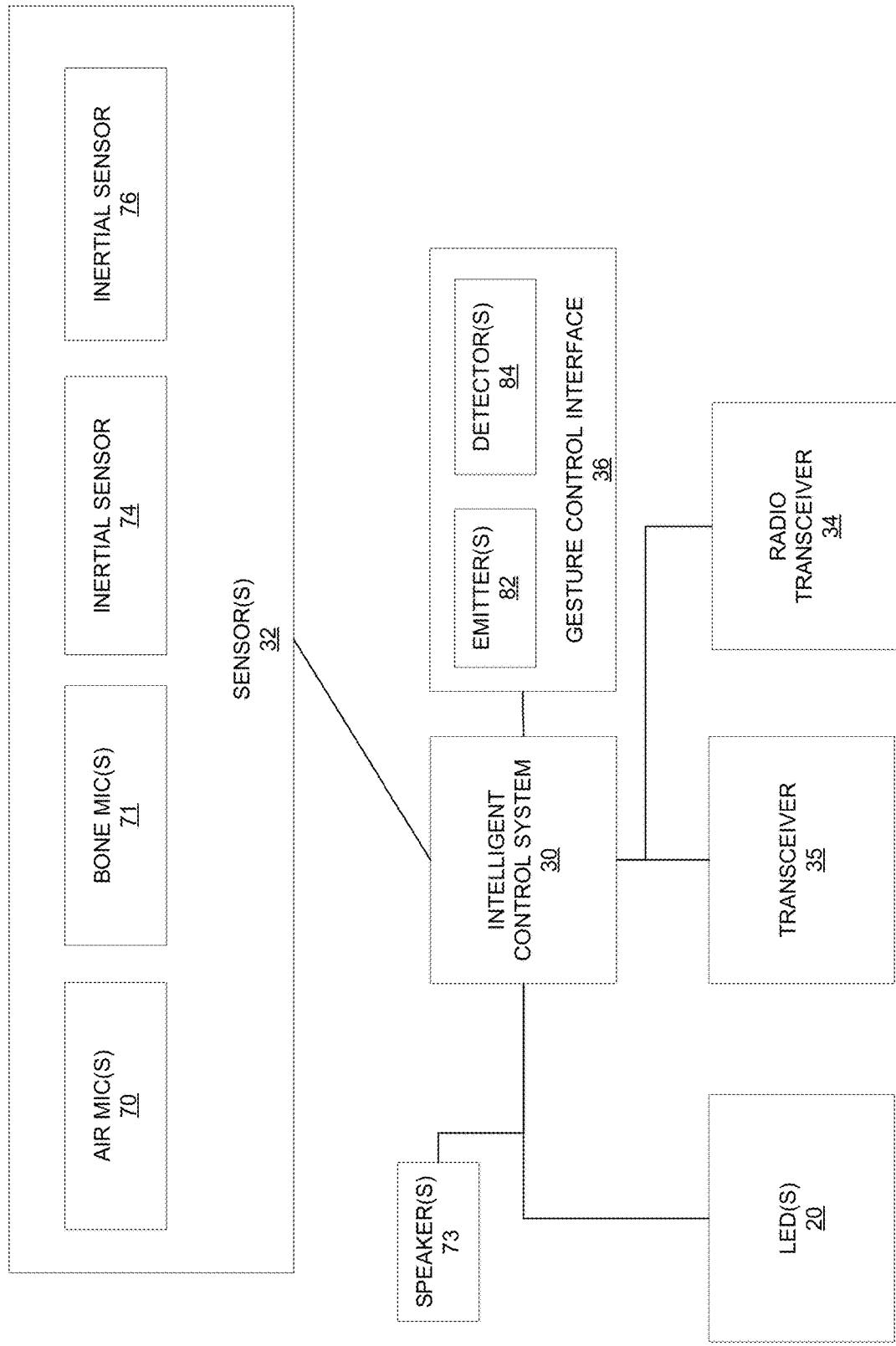
FIG. 4 is another example of a block diagram of one example of an earpiece.

FIG. 4 illustrates a block diagram showing a plurality of sensors 32. These include air microphones 70, bone microphones 71, inertial sensors 74, or other sensors 32. The inertial sensors 74 may include a gyroscope, an accelerometer, and a digital compass. An intelligent control system 30 is shown which may include one or more processors. A gesture control interface 36 includes one or more emitters 82 and one or more detectors 84. One or more speakers 73 are also shown which are electrically connected to the intelligent control system 30. One or more light emitting diodes 20 may be electrically connected to the intelligent control system 30 and may be used for showing state of the earpieces. A transceiver 35 such as a near field magnetic induction transceiver 35 is shown as is a radio transceiver 34 which may be a Bluetooth or BLE or other type of transceiver.

The earpiece device provides for multiple modalities of receiving user input from an individual. These include, without limitation, voice control, accelerometer or inertial sensor based gestures, and other gestures. The earpiece may use the user input from these different modalities in order to determine the location or position in which to insert transcribed voice information.

Voice control. As the earpiece is used for dictation, voice commands may be used to perform the dictation. The voice commands used may be the same or of the type normally used in voice dictation/voice transcript products such as those available from Microsoft IBM, Nuance, Dragon or from other vendors. In addition, the voice commands may be the same or of the type normally used in voice assistant technology such as that available from Google, Apple, Amazon, or other vendors.

Accelerometer sensed gestures. As the earpiece is used for dictation, head movement may be used to provide control for dictation. Head movement may include gestures to indicate yes or no in response to audio prompts from the system, head movement to activate a menu system, or other type of head movements. Head movement may include moving the head forward and back, side-to-side, or other head movements which may be mapped to user input.

Other gestures. Other gestures may be used to control voice dictation functions. This may include gestures such as a single tap, a double tap, a multiple tap, a swipe in a particular direction or other gesture to control voice dictation functions which may be mapped to user input. These are gestures which may be determined with a touch interface or gestural interface as previously described.

An earpiece device allows hands free communication through a wireless network. Said wireless network may use an optimized microphone linked to a voice engine for transcription of the voice data. The system may be configured to insert transcribed voice data into text boxes in the main program, or as directed by a user into a document. Gesture commands may be used to control the system using one or more accelerometers present in the earpiece. In doing so, great flexibility may be achieved to rapidly input data into the document. This allows the user maximal advantage in the data input, increasing the overall efficiency of data input. This is a particularly important advantage to any number of professionals including doctors, lawyers, engineers, accountants, and others.

Figure 5:
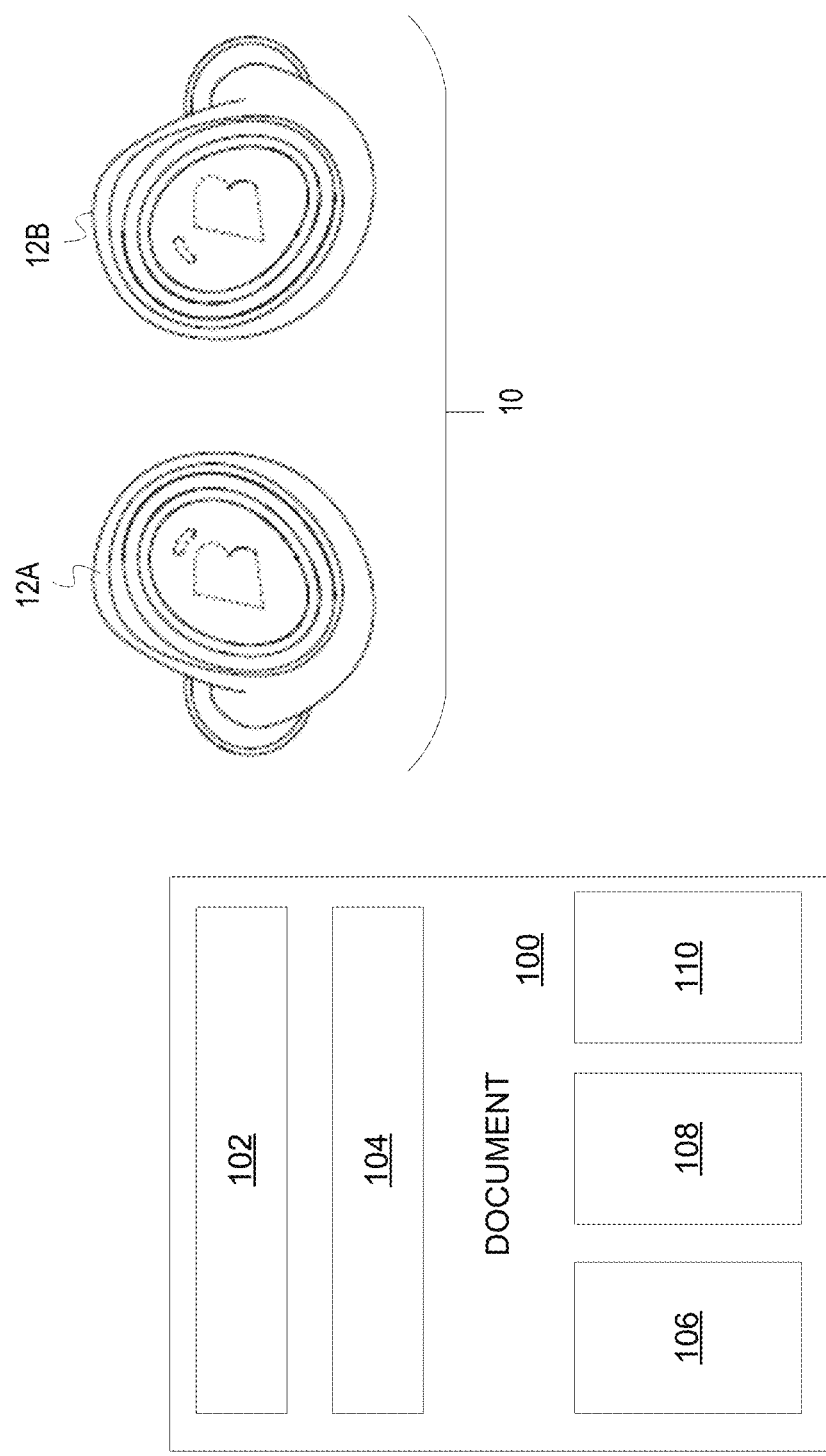
FIG. 5 illustrates a document which receives user input from one or more earpieces.

As shown in FIG. 5 there is a document 100. The document 100 may have a plurality of different input areas 102, 104, 106, 108, 110. Each of these different input areas 102, 104, 106, 108, 110 may allow for text input. In operation, the present invention provide for performing voice dictation with one or more earpieces worn by a user. The method includes receiving as input to the earpiece voice sound information from the user at one or more microphones of the earpiece. The method further includes receiving as input to the earpiece user control information from one or more sensors within the earpiece independent from the one or more microphones of the earpiece. The user control information may be voice control information. For example, a user may identify the text input area where voice input is to be transcribed into in various ways. This may include through identifying the input area using the gestural interface or the inertial sensor. For example, when a blinking cursor is positioned in input area 102 and the user wishes to provide input into input area 104, the user may shake their head no which is detected by the inertial sensor and interpreted by the processor of the earpiece and then communicated to the computing device on which the document 100 is displayed. The computing device may then move to the next input area 104 and the user may begin dictating which is transcribed into voice input into the text input area 104. Similarly, the user may tap multiple times to select an input area or otherwise indicate which input area to use.

It should be appreciated that numerous types of documents are form documents with different input areas. These include various types of legal forms or documents, medical charts or forms, or other types of documents. The methodology described herein allows a user to navigate through the document from an earpiece. It is contemplated that in some implementations, the document 100 need not be seen by the user in order for the user to enter the information. Instead, data may communicated about the document to the earpieces. For, example, field names or prompts or other identifiers for each input area may be communicated through voice to a user and then selected by the user in various ways including through gestural controls, voice, or body movements detected using the inertial sensor(s). Thus, machine machine-generated transcription of the voice sound information from the user may be placed into a user input area associated with an application executing on a computing device. Moreover, manipulation of the application executing on the computing device may be performed based on the user control information.

In addition, to selecting a field for receiving input, a field may be selected for editing in a similar manner. For example, a single word, phrase, sentence, paragraph, or complete input field may be selected for editing in a similar fashion. For example, where an input area includes a paragraph containing multiple sentences, a first sentence may be highlighted. A user may shake their head "no" to indicate that is not the sentence to be edited and then the next sentence may be highlighted. The user may shake their head "no indicate" that is not the sentence to be edited and then the next sentence may be highlighted. The user make shake their head "yes" to indicate that this third sentence is the sentence to be edited and then the user may re-input the sentence using their voice or otherwise. Alternatively, the gestural control interface may be used, such as by tapping three times to indicate it is the third sentence to be edited.

Various, methods, apparatus, and systems have been shown and described related to input and edit functions. Although specific embodiments have been shown and described herein, the present invention contemplates numerous options, variations, and alternatives.

What is claimed is:

1. A method for performing voice dictation with an earpiece worn by a user, the method comprising:
   receiving as input to the earpiece voice sound information from the user at one or more microphones of the earpiece;
   inserting a machine-generated transcription of the voice sound information from the user into a plurality of fields within a user input area associated with an application executing on a computing device, wherein the plurality of fields includes at least a first field and a second field;
   receiving as input to the earpiece a first set of user control information from one or more inertial sensors within the earpiece, each of the one or more inertial sensors comprising an accelerometer;
   manipulating the application executing on the computing device based on the first set of user control information from the one or more inertial sensors within the earpiece to move between the first field and a second field within the plurality of fields within the user input area;
   highlighting a first sentence of the one or more sentences of the second field on a display associated with the application executing on the computing device;
   manipulating the application based on a second set of user control information from a head movement sensed by the accelerometer to move between a first sentence of the one or more sentences of the second field and a second sentence of the one or more sentences of the second field; and
   highlighting the second sentence of the one or more sentences of the second field on the display associated with the application executing on the computing device in response to the head movements sensed by the accelerometer.

2. The method of claim 1 wherein the first set of user control information comprises a head gesture from the user.

3. The method of claim 1 wherein the first set of user control information further comprises a gesture made at or proximate the earpiece to alter a field and detected using one or more sensors of the ear piece.

4. The method of claim 3 wherein the gesture is from a set consisting of a tap, a double tap, a triple tap, a hold, and a swipe.

5. The method of claim 1 wherein the user input area is within a document.

6. The method of claim 1 wherein the second set of user control information is used to indicate whether the machine generated transcription is accurate or not.

7. The method of claim 1 further comprising:
receiving a voice command at the ear piece from the user at the one or more microphones of the earpiece; and
further manipulating the application executing on the computing device using the voice command.

8. A system comprising:
an earpiece comprising:
(a) an earpiece housing;
(b) an inertial sensor disposed within the ear piece housing, the inertial sensor comprising an accelerometer;
(c) a processor disposed within the ear piece housing and operatively connected to the ear piece housing; and
(d) at least one microphone operatively connected to the processor;
(e) wherein the earpiece is configured to sense a plurality of head movements made by a user of the earpiece using the accelerometer of the inertial sensor;
(f) wherein the earpiece is configured to receive voice dictation from the user of the earpiece using the at least one microphone; and
(g) wherein the earpiece is configured to interpret the head movements sensed using the accelerometer of the inertial sensor independent of the at least one microphone into a first set of instructions and convey the first set of instructions to a computing device in operative communication with the earpiece and wherein the first set of instructions comprises voice control information; and
a software application executing on a computing device wherein the software application is configured to:

a) insert machine generated transcription of the voice dictation from the user into a first field within a user input area comprising a plurality of fields, the user input area associated with an application executing on the computing device; and
b) manipulate the application executing on the computing device based on the first set of instructions from a first head movement sensed using the accelerometer of the inertial sensor to move between the first field to a second field within the plurality of fields within the user input area for editing the second field within the user input area;
c) highlight a first sentence of the one or more sentences of the second field on a display associated with the application executing on the computing device;
d) manipulate the application executing on the computing device based on a second set of instructions from a second head movement sensed using the accelerometer of the inertial sensor to move between the first sentence of the second field within the user input area and a second sentence of the second field within the user input area; and
e) highlight the second sentence of the one or more sentences of the second field on the display associated with the application executing on the computing device in response to the second head movement sensed by the accelerometer.

9. The system of claim 8 wherein the earpiece further comprises a gesture control interface operatively connected to the processor, wherein the gesture control interface detects one or more gestures made by the user.

10. The system of claim 8 wherein the software application is a mobile application and the computing device is a mobile device.

* * * * *